April 14, 1959 W. D. HINES 2,881,734
SUCKLING AND FARROWING CRATE
Filed May 13, 1957 2 Sheets-Sheet 1

INVENTOR
WILLIAM D. HINES
BY
ATTORNEY

April 14, 1959  W. D. HINES  2,881,734
SUCKLING AND FARROWING CRATE
Filed May 13, 1957  2 Sheets-Sheet 2

INVENTOR
WILLIAM D. HINES
BY *John Gibson Semmes*
ATTORNEY

United States Patent Office 2,881,734
Patented Apr. 14, 1959

2,881,734

SUCKLING AND FARROWING CRATE

William Dorsey Hines, Chestertown, Md.

Application May 13, 1957, Serial No. 658,713

4 Claims. (Cl. 119—20)

The present invention is related, though patentably distinct from, my earlier invention for a Suckling and Farrowing Crate, namely Patent No. 2,688,308, issued September 7, 1954. It relates to improvements in devices for use in animal husbandry and more specifically to devices for use as suckling and farrowing pens or crates.

As is well known, there is considerable danger to newly born offspring during the farrowing and suckling periods of newborn pigs. Particularly when a sow is in labor and incognizant of danger to the offspring, there is a possibility of the newly born pigs being crushed by the sow especially, as is often the case, when birth is accomplished unattended. In my earlier device, a farrowing crate was provided with adjustable front and rear gates and an inclined ramp leading from the rear gate to a pig receiving box, said pig receiving box being removable and coactably located with respect to a nursing runway. The purpose of that device was to reduce newborn pig mortality by providing sheltered areas for the newborn litter from which areas the newborn could not escape until released manually and into which areas the sow could not walk or lie, thus substantially reducing the possibilities of the sow's crushing or otherwise injuring the small pigs. In this earlier device, the floor was supported above ground level, hence it was necessary to pick up the newly born pigs and place them in the nursing runway adjacent to the sides of the raised floor, at its raised level. My present invention is an improvement over this earlier device in that it accomplishes the identical and additional ends by simpler means of construction.

A primary object of the invention is to prevent all possibility of newborn pigs being crushed by the farrowing sow.

Another object of the invention is to provide a suckling and farrowing crate primarily adapted to protect the young pigs from the sow immediately after birth and which is also adapted to providing means for enabling the pigs to nurse the sow without danger of being crushed after birth.

Another object of the present invention is to provide a suckling and farrowing crate which affords maximum accessibility to the sow for the purpose of cleaning the sow and the interior of the crate and otherwise preparing her for farrowing and suckling in disease-free, infection-free and parasite-free condition during prenatal, farrowing and suckling periods.

Another object of the present invention is to provide a farrowing pen or crate having an adjustable primary gate member which can be moved longitudinally of the farrowing pen to accommodate different size sows and thus position the rear of the sow in close abutment with the rear of the crate.

A still further object of the present invention is to provide a farrowing pen of simple and effective construction wherein a minimum number of means are required to secure the various members of the pen together, the majority of the elements forming the pen being held together by gravity boards and/or removable bolts; thereby rendering the crate easily portable and readily maintained in condition of repair.

A still further object of the present invention is to provide a farrowing crate with means for lowering the floor of the enclosure so as to permit suckling of the young pigs, without manually or mechanically elevating them from the ground or removing the sow from the farrowing crate, thus simplifying the suckling procedure.

Another object of the invention is to provide a ramp from the raised floor of a farrowing enclosure to the ground whereby the pigs are passed onto the ground and into a pig-receiving box which with the ramp coacts to form an under compartment beneath said ramp for containment of placenta and other waste which (by slotted or other means of construction of said ramp) is permitted to fall through the ramp into said under-compartment, apart and separate from the pigs-receiving area of the pig receiving box.

Another object of the present invention is to provide in a farrowing crate a primary gate member with vertical adjusting means in addition to said longitudinal adjusting means, said vertical adjusting means permitting retention of the sow within the crate in substantially the same position while the floor of the enclosure is in the raised farrowing position and while it is in the lowered suckling position.

A further and important object of the present invention is to eliminate the somewhat cumbersome features of my earlier device while accomplishing identical and additional results, namely facilitating the removal of placenta and other waste, facilitating the suckling by greatly simplifying mechanical conversion of this device from its farrowing function into adjustment for its suckling function, removing of rear gate member and substituting therefore adjustable rods or pipes, removing of folding side runways for nursing, removal of weighty bottom side rails, and front gate suspension.

Other objects and advantages of the present invention will be apparent from the following detailed description of an embodiment of the invention taken together with the accompanying drawings in which.

Figure 1:
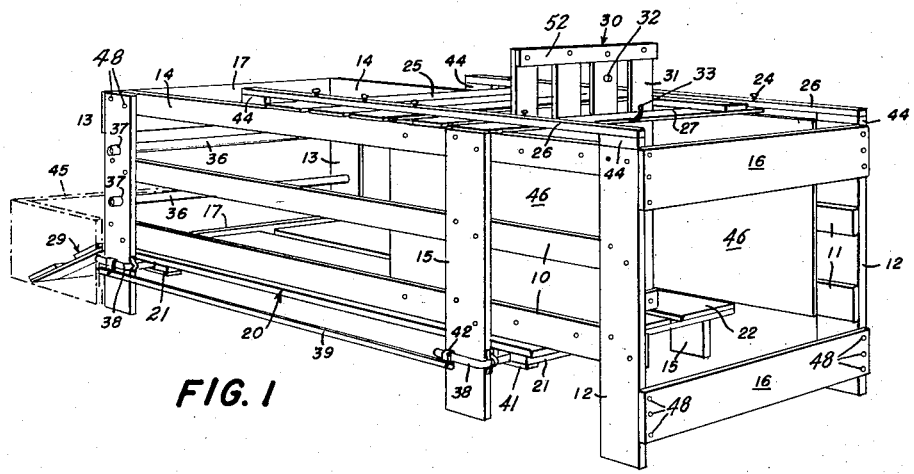
Figure 1 is a perspective view of the crate of the present invention.

The suckling and farrowing crate consists of side members generally designated 10 and 11, each of which are composed of end upright, supporting corner posts 12 and 13 and intermediate supporting post 15. Side boards or slats such as are shown at 14 are interconnected by posts 12 and 13 and intermediate post 15 for rigidity. Preferably that forward portion of the pen adapted for containing the sow's head has closed side walls 46, whereas at the opposite end, adapted for holding the body and rear of the sow, spaced boards 14 permit easy accessibility for cleansing and ventilation. Front cross members 16 and rear cross members 17 are interposed between and secured to the end upright members 12 and 13 by means of nails or bolts 48. Side boards 14 are similarly bolted to the end upright members 12 and 13.

The substantially rectangular floor of the crate is constructed of slats or floor boards 22 which rest on parallel joists 21, said joists positioning and retaining supporting portions 43 of the crank members 38. The slatted construction of the floor permits ventilation and drainage of the interior contents of the crate. As will be seen in Figure 6 the middle floor board 22 at its forward extremity is provided with adjusting holes 35 for locking the bottom of front gate member 30 in its longitudinal positions. For locking purposes a locking pin 34 is vertically inserted through an adjusting hole 50 in the bottom horizontal slat 52 of the front gate member 30, said locking pin further extending through the adjusting holes 35 in the floor board, thereby locking the gate in its longitudinal position. It is this adjustable feature which permits adjustment of the farrowing and suckling crate to any sized sow and facilitates a positioning of her rear adjacent to the ramp 29. Ramp 29 is slotted as at 28 so as to permit the fall of placenta or other waste therethrough, yet support the newly born pig in any position of travel down the ramp. The floor boards 22 are removably supported on transverse supporting portions 43 of crank members 38. Floor boards 22 can be removed for cleaning purposes and are maintained in position by gravity and the limiting force of parallel floor joists 21 acting on the supporting portions 43 of crank members 38. As an extra precaution, straps 41 are employed to retain the supporting portions 43 of crank members within the slots 54 provided by the joists. Side members generally designated 10 and 11 have resting on their upper surfaces block members 44 and longitudinal stringers 26 attached to form longitudinal guides 56 into which ends of roof members 25 are inserted and locked into place by means of loosely fitting removable pins 24. Adjustable roof-members 27 adjacent gate members 30 are identically inserted and fastened into above described longitudinal guides 56. A plurality of holes 23 bored vertically through longitudinal stringer 26 and down into top side boards 14 provide means of longitudinal adjustment of roof boards 25 and roof members 27 by permitting the insertion of said pins 24 through any in-line bores to fasten roof members 25 and 27 within longitudinal guides 56. Longitudinal adjustment of gate member 30 in its upper portion is provided by above described longitudinal adjustment and fastening of slotted roof boards 27.

Figure 5:
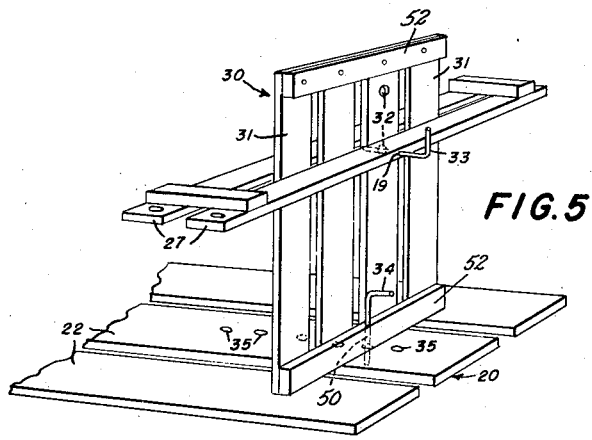
Figure 5 is a fragmentary perspective view of the front gate member illustrating the longitudinal and vertical adjusting means.

As illustrated in Figure 5, vertical adjustment of the gate member 30 is effected by coaction of vertical locking pin 33 with vertical adjusting locking hole 19 in roof board 25 and with adjusting holes 32. Thus, in locked position locking pin 33 extends through holes 19 and 32.

Figure 2:
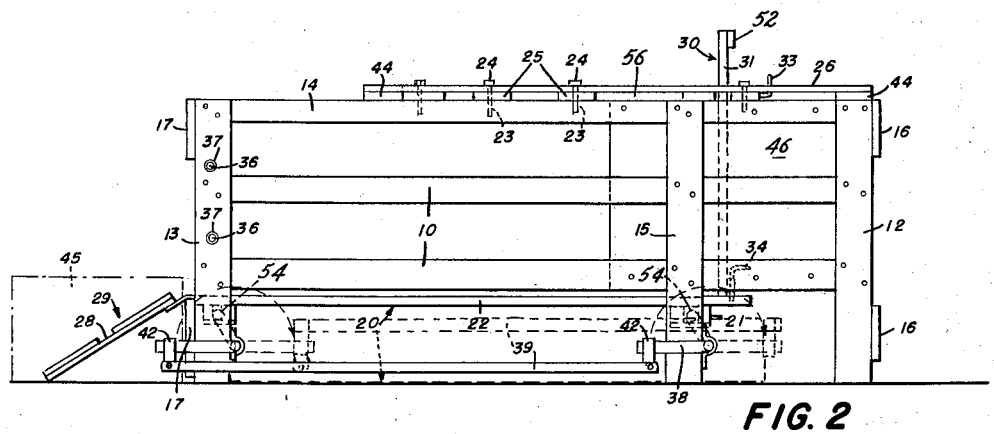
Figure 2 is a side elevational view of the device of Figure 1.
Figure 6:
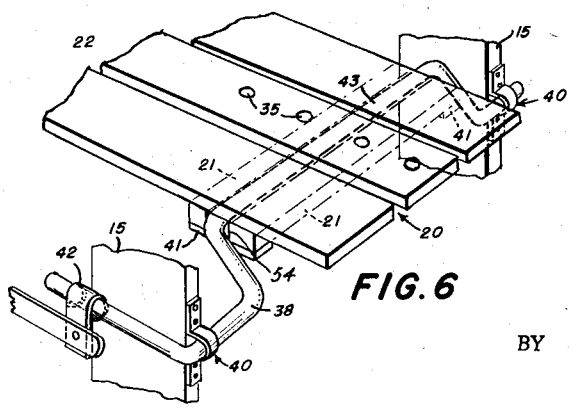
Figure 6 is an enlarged perspective view of the crank members engaging the floor of the enclosure and constituting means for supporting, raising and lowering said floor.
Figure 3:
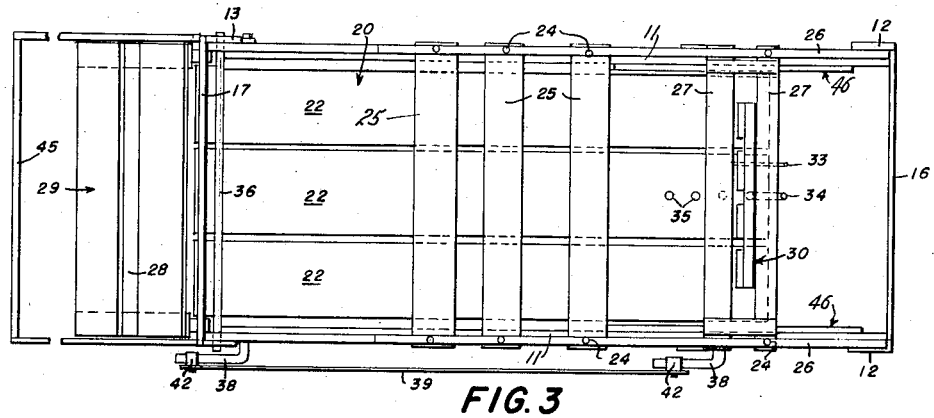
Figure 3 is a plan view of the device.
Figure 4:
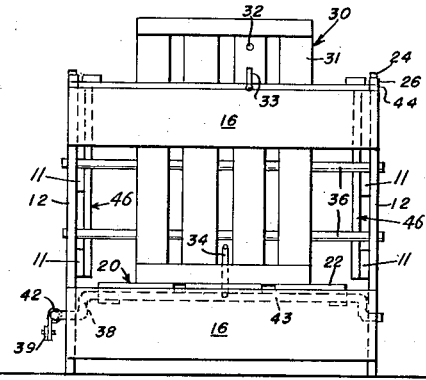
Figure 4 is a front elevational view.

As indicated in Figure 2, crank members 38 are equipped with linkage 39 and are operable through the use of a pipe or other suitable member which is adapted to engage one of the crank member extensions 42. As also indicated in Figure 2 the crank member extension 42 when rotated 180° likewise rotates transverse metal supports 43 from approximately 10° off of vertical upward forward through vertical upward and down to approximately 10° short of vertical downward positions, thereby moving and lowering the farrowing crate floor from farrowing position to suckling position. In the latter position the farrowing crate floor is resting on the ground linkage 39 being in a raised position approximately six inches off the ground and thus an unmonitored suckling is permitted of the newborn pigs which have been manually released from pig-receiving box and allowed to approach sow for nursing. In Figure 2 and Figure 6 the supporting and moving features of the crank members 38 are depicted. Crank member 42 is shaped in an inverted U position, its transverse supporting or mid-portion 43 coacting with floor joists 21 and providing transverse support to the crate floor. Crank member 42 is retained in the floor joists by the movable straps 41 and is further retained and bears on hanger brackets 40 attached to the intermediate supporting posts 15 and rear corner posts 12 and 13. Linkage 39 together with additional linkage provided through attachments between joists 21 and crank members supporting portions 43, said additional linkage being made to exert its effect at an orbital point 90° away from effective action of linkage 39, provides for substantially equivalent movement of crank members 42 thus assuring constant support and moving capabilities of floor 20. Crank members are held in farrowing and suckling positions by gravity and the weights of the sow and floor 20 bearing on the transverse metal support portions 43 of the crank member. As illustrated in Figures 1 and 2, floor 20 in its raised or farrowing position abuts at its farrowing end rear cross member 17 and is thereby braced from urging the crank means to rotate out of raised position.

For rear closure of the farrowing crate, pipes 36 are fitted into holes 37 of end upright supporting corner posts 13. These pipes are removable and are vertically adjustable, according to the number and sets of parallel holes which are placed in posts 13. It is the adjusting feature which permits positioning of the rear closure to the configuration of the sow, thus positioning the sow for farrowing of the pigs onto ramp 29 and preventing her from backing out of the farrowing crate.

From the foregoing, it will appear that the present invention consists of a rectangular crate or pen structure which has access means therefor and a longitudinally and vertically adjustable partition or front gate member interposed between the sides of the forward section of the pen. At the rear end of the crate there are vertically adjustable closure members designed to rest immediately above the sow's rump. In the farrowing position the rectangular floor is raised from the ground sufficiently to adjoin an inclined delivery chute or ramp at the end of the pen. Thus, as the pigs are born, they are delivered to the ground where they are confined in the pig-receiving box. In the suckling position the rectangular floor is lowered to rest upon the ground, thus positioning the sow for suckling and eliminating the necessity of elevating the newborn pigs up to the sow's level for suckling.

Upon termination of the suckling the sow may be elevated to the farrowing position and thus removed from the newly born pigs. This operation is efficiently accomplished by cranking the elevated floor into its raised position.

As may be seen, the present invention represents a distinct improvement over my earlier device and other devices of a similar nature. Here in a single, simply constructed crate dual objectives of farrowing and suckling may be accomplished conveniently and hygenically. Manifestly, changes in details of construction may be made without departing from the spirit and scope of the present invention as defined in the appended claims.

I claim:

1. A suckling and farrowing crate for use by sows comprising self-supporting means defining an enclosure and a vertically adjustable substantially rectangular floor within said enclosure for supporting and positioning a sow during farrowing and suckling, said floor including floor adjusting means comprising at least one crank having a crank extension portion and a transverse supporting portion bearing on said self-supporting means, said transverse supporting portion of said crank supportedly engaging the bottom of said floor in raising or lowering relation with respect to said self-supporting means, and said floor being held in raised farrowing or lowered suckling position by the weight of the sow and said floor bearing on said transverse supporting portion.

2. A suckling and farrowing crate for sows, comprising self-supporting means defining an enclosure, a vertically adjustable floor resting on parallel joists positioned to create a slot for engaging and partially retaining a transverse supporting portion of rotatable crank means attached to and bearing on said self-supporting means and adapted for supporting and adjusting said floor in raised farrowing and lowered suckling positions, a front gate member interposed between sides and forward sections of said enclosure, having vertical and longitudinal adjustment features, a rear closure means comprising transverse removable bars interposed between the sides and rear portions of said enclosure said bars being removable to accommodate a sow's rump, and an inclined slotted ramp attached adjacent to the rear of said enclosure and to the rear of said adjustable floor in its raised farrowing position, supporting the travel of newborn pigs to the ground and permitting placenta and other waste to fall therethrough.

3. A suckling and farrowing crate for sows as described in claim 2, said rotatable crank means bearing on said self-supporting means beneath said floor and being rotatable 180° from approximately 10 degrees off of vertical upward, through vertical upward and down to approximately 10 degrees short of vertical downward position supporting said floor in horizontal raised farrowing position and in horizontal lowered suckling position, and adapted for moving said floor between said raised and lowered positions.

4. A suckling and farrowing crate as described in claim 2, said vertical adjustment features of said front gate including a locking pin for insertion into corresponding vertical adjusting holes in roof boards and a slot of said front gate of said enclosure and said longitudinal adjusting features comprising a locking pin for insertion into corresponding holes in a base of said front gate and the floor boards of said floor.

References Cited in the file of this patent

UNITED STATES PATENTS

| | | |
|---|---|---|
| 751,961 | Trone | Feb. 9, 1904 |
| 2,616,392 | Hutchings | Nov. 4, 1952 |
| 2,688,308 | Hines | Sept. 7, 1954 |